United States Patent
Ding et al.

(10) Patent No.: US 10,361,474 B2
(45) Date of Patent: Jul. 23, 2019

(54) NEAR FIELD COMMUNICATION DEVICE

(71) Applicant: NXP B.V., Eindhoven (NL)

(72) Inventors: Jingfeng Ding, Gratkorn (AT); Ghiath Al-kadi, Gratkorn (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 181 days.

(21) Appl. No.: 15/462,757

(22) Filed: Mar. 17, 2017

(65) Prior Publication Data

US 2018/0269560 A1 Sep. 20, 2018

(51) Int. Cl.
| | |
|---|---|
| H01Q 3/26 | (2006.01) |
| H01Q 1/50 | (2006.01) |
| H01Q 1/22 | (2006.01) |
| H04B 5/00 | (2006.01) |
| G06K 7/10 | (2006.01) |
| G06K 19/07 | (2006.01) |
| H01Q 1/24 | (2006.01) |

(52) U.S. Cl.
CPC ....... *H01Q 1/2216* (2013.01); *G06K 7/10237* (2013.01); *G06K 19/0727* (2013.01); *H01Q 1/243* (2013.01); *H01Q 1/50* (2013.01); *H01Q 3/26* (2013.01); *H04B 5/0031* (2013.01); *H04B 5/0037* (2013.01); *H04B 5/0075* (2013.01)

(58) Field of Classification Search
CPC ........ H01Q 1/2216; H01Q 1/22; H01Q 1/243; H01Q 3/26; H01Q 1/50; H04B 5/0037
USPC ......................................................... 343/702
See application file for complete search history.

(56) References Cited

U.S. PATENT DOCUMENTS

| | | | |
|---|---|---|---|
| 8,818,297 B2 | 8/2014 | Merlin | |
| 2010/0248653 A1* | 9/2010 | Merlin | G06K 19/07749 455/90.1 |
| 2010/0321128 A1 | 12/2010 | Merlin | |
| 2011/0043429 A1 | 2/2011 | Merlin | |
| 2013/0020988 A1 | 1/2013 | Kim et al. | |
| 2013/0029595 A1* | 1/2013 | Widmer | H04B 5/0031 455/39 |
| 2014/0187153 A1 | 7/2014 | Zhu et al. | |

(Continued)

OTHER PUBLICATIONS

Extended European Search Report for Patent Appl. No. 18159320.3 (dated Aug. 1, 2018).

(Continued)

*Primary Examiner* — Hai V Tran
(74) *Attorney, Agent, or Firm* — Shuqian Yan

(57) ABSTRACT

A near field communication (NFC) device capable of operating by being powered by the field includes an NFC module for generating an electromagnetic carrier signal and modulating the carrier signal, and an antenna circuit coupled to and driven by said NFC module with the modulated carrier signal. A differential power combiner circuit is coupled to said NFC module via output terminals of said NFC module. A powered by the field circuit of the NFC device is adapted to harvest energy from an external field to power said NFC device. The power by the field circuit has a first terminal coupled to an output of said differential power combiner circuit via a first impedance block and a second terminal coupled to an input of said antenna circuit via a second impedance block. The NFC device is adapted to be able to operate in a powered by the field card mode.

20 Claims, 4 Drawing Sheets

(56) References Cited

U.S. PATENT DOCUMENTS

2015/0031315 A1\* 1/2015 Pieber .................... H04B 1/44
  455/78
2016/0028244 A1 1/2016 Ichikawa

OTHER PUBLICATIONS

Extended European Search Report for Patent Appl. No. 18159825.1 (dated Aug. 1, 2018).
Application for related U.S. Appl. No. 15/462,771, (filed Mar. 17, 2017).
Office Action for related U.S. Appl. No. 15/462,771 (dated Aug. 7, 2017).

\* cited by examiner

NEAR FIELD COMMUNICATION DEVICE

The present disclosure generally relates to contactless communication, and more specifically, to a near field communication (NFC) device capable of operating by being powered by the field.

NFC is widely used in a variety of applications including mobile devices, e.g., smartphones and tablets, to establish radio communication with each other by touching them together or bringing them into close proximity such as a few to several centimeters or inches. NEC-enabled mobile devices may be used for ticketing, access control systems, payment services, etc. Usually, the NFC module equipped in a mobile device is powered by the hosting mobile device via some sort of autonomous energy sources due to their mobile character. Such energy sources are usually batteries or accumulators, which can be recharged.

However, it is conceivable that the readiness of operation of the mobile device is not always guaranteed as the battery or the accumulator is unloaded or exhausted. Therefore, it is possible that the NFC functionality of the mobile device is not always available when needed. This, of course, creates problems for a user when he needs to, for instance, transfer ticket data or access data via secure NFC in order to access a building, a train or train station, a laboratory room, etc. There is a strong demand that the NEC module equipped in a mobile device must still be operable when the battery has been exhausted in order to keep the NFC functionality available. This demand has resulted in considerations of using electric energy that is provided by an electromagnetic field generated by an external reading device. This so called "powered by the field mode" has already been implemented in standard NFC cards where a powered by the field circuitry is directly connected with the antenna.

FIG. 1 is an example NFC device using a singled ended antenna. As shown in FIG. 1, the NEC device includes an NFC module 2', such as type no. PN5xx manufactured by NXP Semiconductors. NEC module 2' may include a transmitter 3' being adapted to generate an electromagnetic carrier signal, to modulate the carrier signal according to data to be transmitted and to drive an antenna circuit 5' with the modulated carrier signal. NFC module 2' may further include a receiver 4' being adapted to sense response signals being received at antenna circuit 5' and to demodulate the response signals. NFC module 2' has output terminals TX1 and TX2. A differential LC power combiner circuit 6' is coupled between the output terminals TX1 and TX2 and antenna circuit 5'.

It should be noticed that the NEC device of FIG. 1 has a single ended antenna matching topology and does not use a balanced to unbalanced (Balun) transformer. The NEC device of FIG. 1 is not capable of operating by being powered by the field.

FIG. 2 is another example NEC device using a singled ended antenna. As shown in FIG. 2, between the output terminals TX1 and TX2 of NFC module 2" and antenna circuit 5", the following circuits are switched into the transmitting paths: an electromagnetic compatibility (EMC) filter 6" comprising two inductors $L_{EMC}$ and two capacitors $C_{EMC}$, a balanced to unbalanced (Balun) transformer 7" for converting differential antenna matching network to single-end antenna matching network, and an impedance matching network (not shown).

As with the NFC device of FIG. 1, the NFC device of FIG. 2 is also not capable of operating by being powered by the field.

FIG. 3 is an example NEC device using a differential antenna. A Balun transformer is not used for this implementation as the system is fully differential.

As shown in FIG. 3, a powered by the field circuitry 6 is coupled to the antenna circuit 5 via. AC coupling capacitors C4. The powered by the field circuitry may include a rectifier and a limiter. Further, a pair of switches S1 and S2 are used, which are controlled by mode selection means 7. Mode selection means 7 is adapted to switch the outputs of the switches S1 and S2 to ground in a reader mode and optionally in a card mode, so that the second terminals of the AC coupling capacitors C4 are drawn to ground potential, and to switch the outputs of the switches S1 and S2 to the inputs of powered by the field circuitry 6 in a powered by the field mode, such that AC electric energy is fed via the AC coupling capacitors C4 to the inputs of powered by the field circuitry 6 where it is converted into DC electric energy to be used for supplying NFC module 2. It should be noticed that the switches S1 and S2, mode selection means 7, and/or powered by the field circuitry 6 may be configured as discrete components or integrated in NFC module 2.

Unlike the NEC devices discussed above in FIG. 1 and FIG. 2, the NFC device of FIG. 3 is capable of operating by being powered by the field radiated by a terminal with which it communicates and without using the power of a battery.

SUMMARY

A device for contactless communication comprises an NFC module being adapted to generate an electromagnetic carrier signal and to modulate the carrier signal according to data to be transmitted; a differential power combiner circuit coupled to said NFC module via output terminals of said NFC module; and an antenna circuit coupled to and driven by said NFC module with the modulated carrier signal. Said NFC module further comprises a power by the field (PBF) circuit adapted to harvest energy from an external field to power said device, wherein said power by the field circuit has a first terminal coupled to an output of said differential power combiner circuit via a first impedance block and a second terminal coupled to an input of said antenna circuit via a second impedance block. Said device is adapted to be able to operate in a power by the field card mode.

In one example embodiment, said first impedance block includes a first impedance element internal to the NFC module and a second impedance element external to the NFC module. Said first and second impedance elements being arranged in series. And said second impedance block includes a third impedance element internal to the NFC module and a fourth impedance element external to the NFC module. Said third and fourth impedance elements being arranged in series.

In one example embodiment, said first impedance element is further coupled to a first switch, said first impedance element and said first switch being arranged in parallel. And said third impedance element is further coupled to a second switch, said third impedance element and said second switch being arranged in parallel.

In one example embodiment, said first and second switches are configured to be closed when said device operates in the powered by the field card mode.

In one example embodiment, said first and second switches are configured to be open when said device operates in a reader mode.

In one example embodiment, said first impedance block includes a first impedance element external to the NFC module, and said second impedance block includes a second impedance element external to the NFC module.

In one example embodiment, said first impedance element is further connected in series to a first switch, said first switch being internal to the NFC module. And said second impedance element is further connected in series with a second switch, said second switch being internal to the NFC module.

In one example embodiment, said antenna circuit is a single end antenna.

In one example embodiment, said device has a single end antenna matching topology and does not use a balanced to unbalanced (Balun) transformer.

In one example embodiment, said differential power combiner circuit is a differential LC power combiner circuit comprising an inductor and a capacitor connected in series.

In one example embodiment, said device further comprises a capacitor and an inductor arranged in series between said output of said differential power combiner circuit and said input of said antenna circuit.

In one example embodiment, said device further comprises one or more tuning capacitors for tuning phases of incoming signals to the NFC module.

In one example embodiment, said device is incorporated in a mobile device and adapted to be powered by the mobile device.

In one example embodiment, said device is further adapted to be able to operate in a reader mode.

In one example embodiment, said device is adapted to perform active load modulation (ALM) in a card mode.

In one example embodiment, said device is adapted to perform passive load modulation (PLM) in the power by the field card mode.

An NFC device comprises an NFC module being adapted to generate an electromagnetic carrier signal and to modulate the carrier signal according to data to be transmitted; a differential power combiner circuit coupled to said NFC module via output terminals of said NFC module; and an antenna circuit coupled to and driven by said NFC module with the modulated carrier signal, said antenna circuit being a single ended antenna.

Said NFC module further comprises a power by the field (PBF) circuit adapted to harvest energy from an external field to power said NFC device, wherein said power by the field circuit has a first terminal coupled to an output of said differential power combiner circuit via a first impedance block and a second terminal coupled to an input of said antenna circuit via a second impedance block.

In one embodiment, said NFC device is adapted to be able to operate in a power by the field card mode.

In one example embodiment, the NFC device has a single end antenna matching topology and does not use a balanced to unbalanced (Balun) transformer.

In one example embodiment, said NFC device is incorporated in a mobile device and adapted to be powered by the mobile device.

In one example embodiment, the NFC device is adapted to perform passive load modulation (PLM) in the power by the field card mode.

The above discussion is not intended to represent every example embodiment or every implementation within the scope of the current or future Claim sets.

Various example embodiments may be more completely understood in consideration of the following Detailed Description in connection with the accompanying Drawings.

Figure 1:
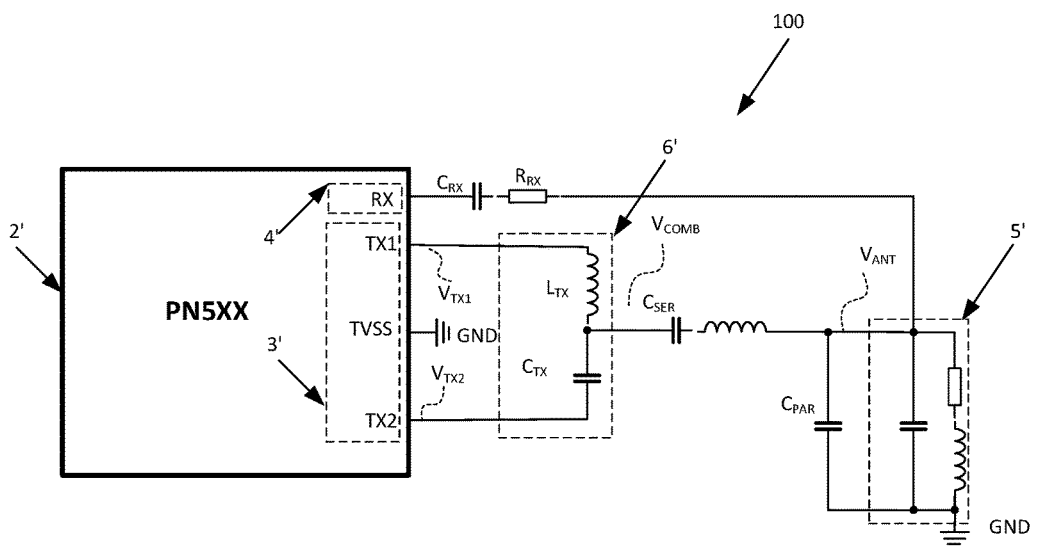
FIG. 1 is an example NFC device.
Figure 2:
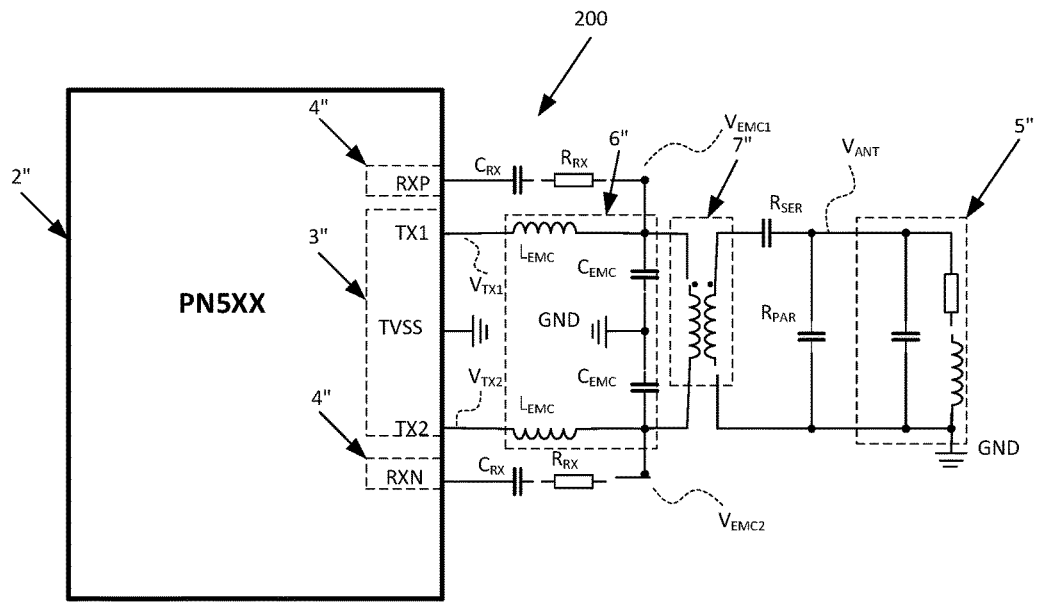
FIG. 2 is another example NFC device.
Figure 3:
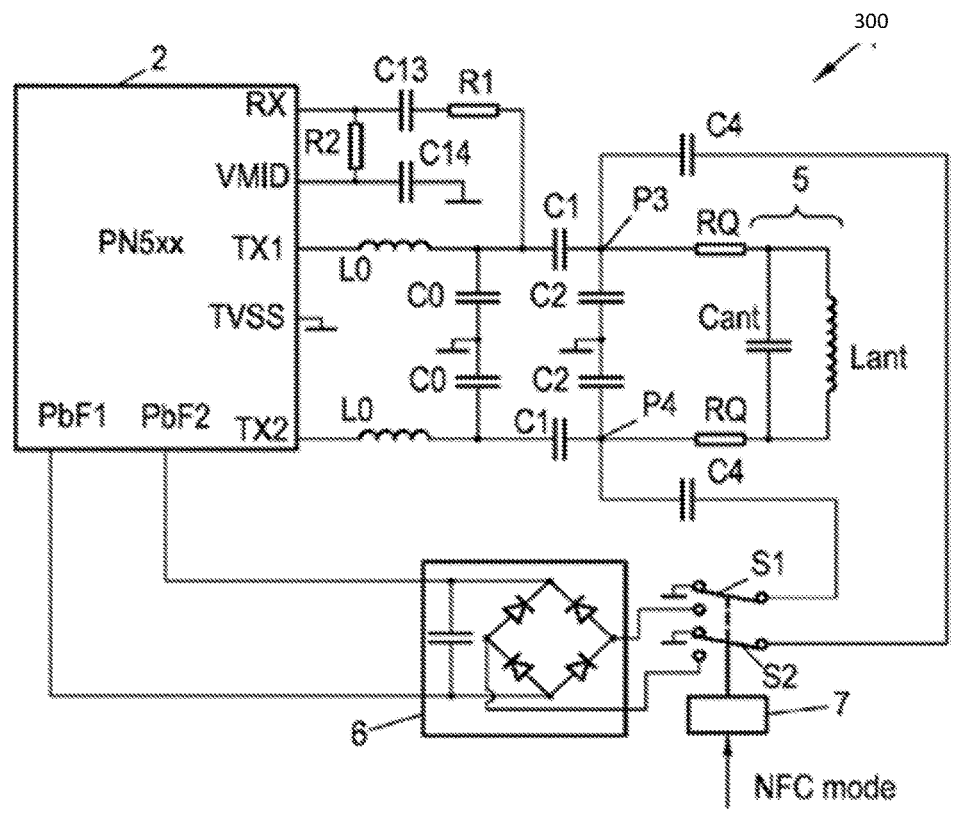
FIG. 3 is a further example of an NFC device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

The example embodiments as will be discussed below disclose an NFC device capable of operating by being powered by the field. The NFC device has a single ended antenna matching topology and does not require the use of a balanced to unbalanced (Balun) transformer. The NFC device supports various NFC functionality as will be discussed below in more detail.

Figure 4:
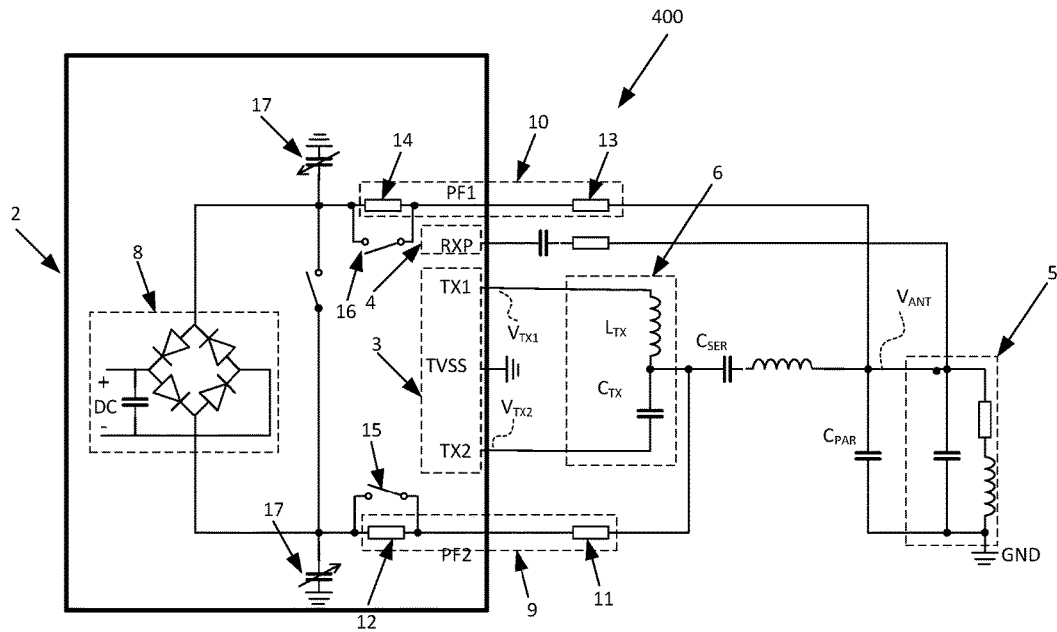
FIG. 4 is a first example embodiment of an NFC device.

FIG. 4 is a first example embodiment of an NFC device. As shown in FIG. 4, the NFC device includes an NFC module 2 having a transmitter 3 and a receiver 4. Transmitter 3 generates an electromagnetic carrier signal. The carrier signal is modulated according to data to be transmitted. An antenna circuit 5 is driven with the modulated carrier signal. The antenna circuit as depicted in FIG. 4 is a single-ended antenna. NFC module 2 has output terminals TX1 and TX2. A differential power combiner circuit 6 is coupled between the output terminals TX1 and TX2 and antenna circuit 5. In one embodiment, the differential power combiner circuit is a differential LC power combiner circuit comprising an inductor and a capacitor connected in series. Receiver 4 is well known to those skilled in the art, and thus would not be explained in further detail.

NFC module 2 may further include a powered by the field circuit 8, which is adapted to harvest energy from an external electromagnetic (EM) field by converting AC electric energy into DC electric energy to be used for supplying NFC module 2 and/or the NFC device. The powered by the field circuit may include a rectifier and a limiter.

As depicted in FIG. 4, a first input terminal of said powered by the field circuit is connected to an output of differential power combiner circuit 6 via a first impedance block 9, and a second input terminal of said powered by the field circuit is connected to an input of antenna circuit 5 via a second impedance block 10. Each of said first and second impedance blocks includes at least one impedance element, which may be one of a resistor, an inductor, a capacitor, and a combination thereof.

In this embodiment, first impedance block 9 includes an impedance element 11 external to NFC module 2 and an impedance element 12 internal to said NFC module and arranged in series with impedance element 11. In this embodiment, second impedance block 10 includes an impedance element 13 external to NFC module 2 and an impedance element 14 internal to said NFC module and arranged in series with impedance element 13.

It should be noted that "internal to the/said NFC module" as used throughout the disclosure means the particular element is integrated in the NFC module, whereas "external to the/said NFC module" means the particular element is not integrated in the NFC module, but rather a discrete and separate element.

In this embodiment, impedance element 12 is further coupled to a first switch 15 and arranged in parallel with said first switch. In this embodiment, impedance element 14 is further coupled to a second switch 16 and arranged in parallel with said second switch. Said first and second switches can be configured depending on the operating mode of the NFC device. For example, said first and second switches are configured to be closed when the NFC device operates in a powered by the field mode. This enables more power to be harvested from the external field by the powered by the field circuit. On the other hand, said switches are configured to be open when the NFC device is actively transmitting such as in a reader mode. By opening the switches, more current flows into the receiver of said NFC module, resulting in more output power when the NFC device is actively transmitting.

In this embodiment, a pair of tuning or variable capacitors 17 are integrated in the NFC module as depicted in FIG. 4. The tuning capacitors are used for tuning phases of incoming signals to the NFC module in the case that the phases of these incoming signals are not differential. To maximize the amount of power harvested from an external field, it is desirable to keep a 180-degree phase shift between the incoming signals.

The NEC device of FIG. 4 is capable of operating in each of a reader mode, a battery supplied card mode, and a powered by the field card mode. In the card mode, the NFC device is adapted to perform active load modulation (ALM) or passive load modulation (PLM) when it is actively transmitting. In the case that no power is supplied from a battery, the NFC device performs passive load modulation in the powered by the field card mode when the device is transmitting.

Figure 5:
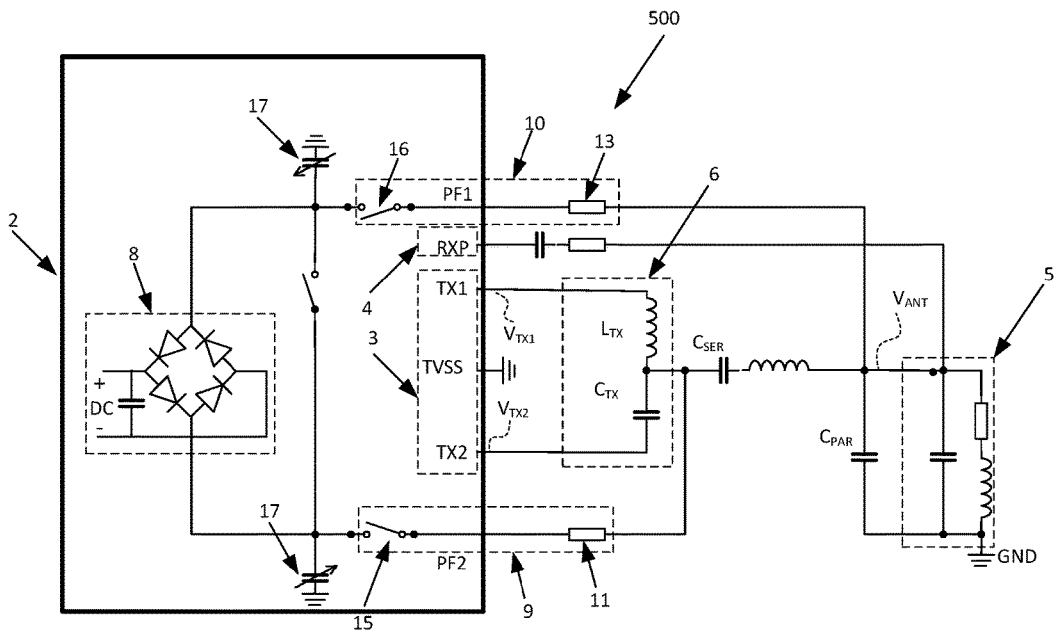
FIG. 5 is a second example embodiment of the NFC device.

FIG. 5 is a second example embodiment of the NFC device using a single-ended antenna. This embodiment and the first embodiment of FIG. 4 have much in common. The main difference lies in how the powered by the field circuit is connected to the NEC device as explained in detail below.

As shown in FIG. 5, a first input terminal of said powered by the field circuit is connected to an output of differential power combiner circuit 6 via first impedance block 9, and a second input terminal of said powered by the field circuit is connected to an input of antenna circuit via second impedance block 10.

In this embodiment, first impedance block 9 includes impedance element 11 external to said NFC module, and second impedance block 10 includes impedance element 13 external to said NFC module.

In this embodiment, impedance element 11 is further arranged in series with a first switch 15, which is internal to said NFC module. Similarly, impedance element 13 is further arranged in series with a second switch 16, which is internal to said NFC module. Said first and second switches can be configured depending on the operating mode of said NFC device as explained in the above-described first embodiment.

The NFC device of FIG. 5 is also capable of operating in each of a reader mode, a battery supplied card mode, and a powered by the field card mode. In the card mode, the NFC device is adapted to perform active load modulation (ALM) or passive load modulation (PLM) when the device is actively transmitting. In the case that power is not supplied by a battery, the NFC device performs passive load modulation in the powered by the field card mode when the device is transmitting.

Figure 6:
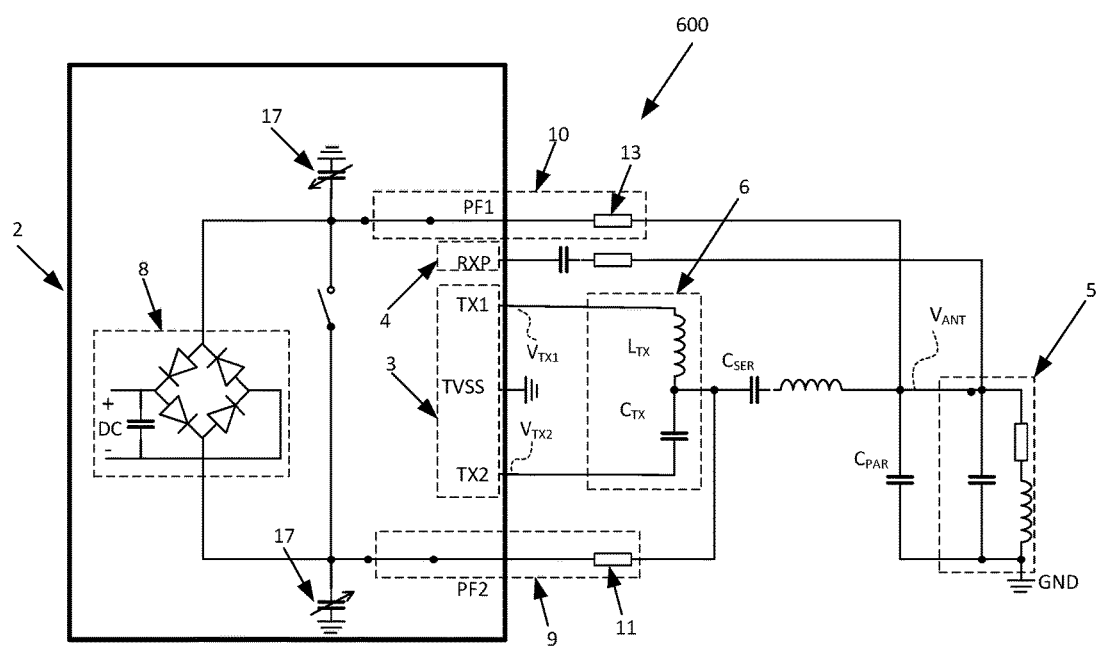
FIG. 6 is a third example embodiment of the NFC device.

FIG. 6 is a further example embodiment of an NFC device using a single-ended antenna. This embodiment and the above-mentioned embodiments have much in common. The main difference lies in how the powered by the field circuit is connected to the NFC device as explained in detail below.

As shown in FIG. 6, a first input terminal of said powered by the field circuit is connected to an output of differential power combiner circuit 6 via first impedance block 9, and a second input terminal of said powered by the field circuit is connected to an input of antenna circuit via second impedance block 10.

In this embodiment, first impedance block 9 includes impedance element 11 external to said NFC module, and second impedance block 10 includes impedance element 13 external to said NFC module. Each of said first and second impedance elements may be one of a resistor, an inductor, a capacitor, and a combination thereof.

As with the previously discussed embodiments, the NFC device of FIG. 6 is also capable of operating in each of a reader mode, a battery supplied card mode, and a powered by the field card mode. In the card mode, the NFC device is adapted to perform active load modulation (ALM) or passive load modulation (PLM) when the device is actively transmitting. In the case that power is not supplied by a battery, the NFC device performs passive load modulation in the powered by the field card mode when the device is transmitting.

It should be noted that the powered by the field circuit incorporated in the above example embodiments is fully differential. However, it may also be implemented using either the high side bridge or the low side bridge.

It should be noted that whether an impedance element is internal or external to the NFC module is arbitrary. For example, the first example embodiment illustrates an impedance element internal to the NFC module and another impedance element external to the NFC module for each impedance block, whereas the second and third example embodiments illustrate an impedance element external to the NFC module. Alternative embodiment may be implemented using an impedance element internal to the NFC module only. Likewise, whether the switches (switches 15 and 16) are internal or external to the NFC module is also arbitrary.

The NFC device according to the above-mentioned example embodiments may be incorporated into a mobile device, e.g., a mobile phone, and adapted to be powered by the mobile device.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:
1. A device, for contactless communication comprising:
an NFC module being adapted to generate an electromagnetic carrier signal and to modulate the carrier signal according to data to be transmitted;

a differential power combiner circuit coupled to said NFC module via output terminals of said NFC module; and
an antenna circuit coupled to and driven by said NFC module with the modulated carrier signal;
said NFC module comprising a power by the field (PBF) circuit adapted to harvest energy from an external field to power said device;
said power by the field circuit having a first terminal coupled to an output of said differential power combiner circuit via a first impedance block and a second terminal coupled to an input of said antenna circuit via a second impedance block;
said device being adapted to be able to operate in a power by the field card mode;
wherein said first impedance block includes a first impedance element internal to the NFC module and a second impedance element external to the NFC module, said first and second impedance elements being arranged in series;
wherein said second impedance block includes a third impedance element internal to the NFC module and a fourth impedance element external to the NFC module, said third and fourth impedance elements being arranged in series;
wherein said first impedance element is further coupled to a first switch, said first impedance element and said first switch being arranged in parallel; and
wherein said third impedance element is further coupled to a second switch, said third impedance element and said second switch being arranged in parallel.

2. The device of claim 1, wherein said first and second switches are configured to be closed when said device operates in the powered by the field card mode.

3. The device of claim 1, wherein said first and second switches are configured to be open when said device operates in a reader mode.

4. The device of claim 1, wherein said antenna circuit is a single end antenna.

5. The device of claim 1, wherein said device has a single end antenna matching topology and does not use a balanced to unbalanced (Balun) transformer.

6. The device of 1, further comprising one or more tuning capacitors for tuning phases of incoming signals to the NFC module.

7. The device of claim 1, wherein said device is incorporated in a mobile device and adapted to be powered by the mobile device.

8. The device of claim 1, wherein said device is further adapted to be able to operate in a reader mode.

9. The device of claim 1, wherein said device is adapted to perform active load modulation (ALM) in a card mode.

10. The device of claim 1, wherein said device is adapted to perform passive load modulation (PLM) in the power by the field card mode.

11. A device for contactless communication comprising:
an NFC module being adapted to generate an electromagnetic carrier signal and to modulate the carrier signal according to data to be transmitted;
a differential power combiner circuit coupled to said NFC module via output terminals of said NFC module; and
an antenna circuit coupled to and driven by said NFC module with the modulated carrier signal;
said NFC module comprising a power by the field (PBF) circuit adapted to harvest energy from an external field to power said device;
said power by the field circuit having a first terminal coupled to an output of said differential power combiner circuit via a first impedance block and a second terminal coupled to an input of said antenna circuit via a second impedance block;
said device being adapted to be able to operate in a power by the field card mode;
wherein said first impedance block includes a first impedance element external to the NFC module;
wherein said second impedance block includes a second impedance element external to the NFC module;
wherein said first impedance element is further connected in series to a first switch, said first switch being internal to the NFC module; and
wherein said second impedance element is further connected in series with a second switch, said second switch being internal to the NFC module.

12. A device for contactless communication comprising:
an NFC module being adapted to generate an electromagnetic carrier signal and to modulate the carrier signal according to data to be transmitted;
a differential power combiner circuit coupled to said NFC module via output terminals of said NFC module; and
an antenna circuit coupled to and driven by said NFC module with the modulated carrier signal;
said NFC module comprising a power by the field (PBF) circuit adapted to harvest energy from an external field to power said device;
said power by the field circuit having a first terminal coupled to an output of said differential power combiner circuit via a first impedance block and a second terminal coupled to an input of said antenna circuit via a second impedance block;
said device being adapted to be able to operate in a power by the field card mode;
wherein said differential power combiner circuit is a differential LC power combiner circuit comprising an inductor and a capacitor connected in series;
wherein a capacitor and an inductor are arranged in series between said output of said differential power combiner circuit and said input of said antenna circuit.

13. The device of claim 12,
wherein said first impedance block includes a first impedance element internal to the NFC module and a second impedance element external to the NFC module, said first and second impedance elements being arranged in series; and
wherein said second impedance block includes a third impedance element internal to the NFC module and a fourth impedance element external to the NFC module, said third and fourth impedance elements being arranged in series.

14. The device of claim 13,
wherein said first impedance element is further coupled to a first switch, said first impedance element and said first switch being arranged in parallel; and
wherein said third impedance element is further coupled to a second switch, said third impedance element and said second switch being arranged in parallel.

15. The device of claim 12,
wherein said first impedance block includes a first impedance element external to the NFC module; and
wherein said second impedance block includes a second impedance element external to the NFC module.

16. The device of claim 15,
wherein said first impedance element is further connected in series to a first switch, said first switch being internal to the NFC module; and wherein said second impedance element is further connected in series with a second switch, said second switch being internal to the NFC module.

17. The device of claim 12, wherein said antenna circuit is a single end antenna.

18. The device of claim 12, wherein said device has a single end antenna matching topology and does not use a balanced to unbalanced (Balun) transformer.

19. The device of claim 12, wherein said device is adapted to perform active load modulation (ALM) in a card mode.

20. The device of claim 12, wherein said device is adapted to perform passive load modulation (PLM) in the power by the field card mode.

\* \* \* \* \*